United States Patent [19]

Micali

[11] Patent Number: 5,666,414
[45] Date of Patent: Sep. 9, 1997

[54] GUARANTEED PARTIAL KEY-ESCROW

[76] Inventor: Silvio Micali, 459 Chestnut Hill Ave., Brookline, Mass. 02146

[21] Appl. No.: 620,080

[22] Filed: Mar. 21, 1996

Related U.S. Application Data

[60] Provisional application No. 60/003,028, Aug. 31, 1995 and provisional application No. 60/003,223, Sep. 5, 1995.

[51] Int. Cl.⁶ .............................. H04L 9/00; H04K 1/00
[52] U.S. Cl. .................. 380/21; 380/30; 380/45
[58] Field of Search ......................... 380/21, 30, 45

[56] References Cited

U.S. PATENT DOCUMENTS

| | | |
|---|---|---|
| 4,265,827 | 5/1981 | McDonald . |
| 4,326,098 | 4/1982 | Bouricius et al. . |
| 4,879,747 | 11/1989 | Leighton et al. . |
| 4,908,861 | 3/1990 | Brachtl et al. . |
| 4,924,514 | 5/1990 | Matyas et al. . |
| 4,944,009 | 7/1990 | Micali et al. . |
| 4,995,081 | 2/1991 | Leighton et al. . |
| 5,081,676 | 1/1992 | Chou et al. . |
| 5,177,791 | 1/1993 | Yeh et al. . |
| 5,208,853 | 5/1993 | Armbruster et al. . |
| 5,214,698 | 5/1993 | Smith, Sr. et al. . |
| 5,276,737 | 1/1994 | Micali . |
| 5,315,658 | 5/1994 | Micali . |

OTHER PUBLICATIONS

Micali, S., "Fair Public–Key Cryptosystems", Cryptosystems, May 20, 1992.

Pederson, Torben Pryds, "Distributed Provers with Applications to Undeniable Signatures", Eurocrypt '91 Abstracts, Univ. of Sussex, Brighton, UK, 8th–11th Apr. 1991, pp. 117–122.

Beth, Th., "Zur Diskussion gestellt, Informatic Spektrum", vol. 13, 1990, pp. 204–215.

Feldman, Paul, "A Practical Scheme for Noninteractive Verifiable Secret Sharing", 1987, pp. 427–437.

Blakley, G.R., "Safeguarding Cryptographic Keys, AFIPS–Conference Proceedings", vol. 48, National Computer Conference, 1979, pp. 313–317.

Shamir, Adi, "How to Share a Secret", Communication of the ACM, vol. 22, No. 11, Nov. 1979, pp. 612–613.

DeMillo, Richard A., Davida, George I., Dobkin, David P.; Harrison, Michael A.; and Lipton, Richard J., "Cryptology in Revolution: Mathematics and Models", San Francisco, CA, Jan. 5–6, 1981, pp. 152–155.

Simmons, Gustavus J., "How to (Really) Share a Secret", Advances in Cryptology—CRYPTO '88, pp. 390–448.

Desmedt, Yvo; and Frankel, Yair, "Threshold Cryptosystems", Advances in Cryptology—CRYPTO '89, pp. 307–315.

Benaloh, Josh Cohen, "Secret Sharing Homomorphisms: Keeping Shares of A Secret Secret", Advances in Cryptology—CRYPTO '86, pp. 251–260.

Galil, Zvi; & Yung, Moti, "Partitioned Encryption & Achieving Simultaneity by Partitioning", Oct. 19, '87, pp. 81–88.

(List continued on next page.)

*Primary Examiner*—Stephen C. Buczinski
*Attorney, Agent, or Firm*—Foley, Hoag & Eliot LLP

[57] ABSTRACT

A given decryption key is decomposed into at least two parts, for example, a first subkey and a second subkey. The first subkey may be verifiably secret-shared among a set of one or more trustees, whereas the trustees preferably receive no information at all about the second subkey. Reconstruction of the first subkey by the trustees does not yield a decryption key useful by itself in decrypting ciphertexts. The trustees, however, also receive a guarantee that once they reveal their shares to a given entity, the entity has the capability of determining the second subkey. Generally, the generation of the second subkey will be carried out by the entity using a brute force technique, although the calculation may be performed by still another party (or even the trustees themselves in cooperation with the entity). Once the second subkey is determined, the guarantee ensures that combination of the first and second subkeys yields a given decryption key that may then be used to decrypt ciphertexts.

23 Claims, 1 Drawing Sheet

OTHER PUBLICATIONS

Feldman, Paul Neil, "Optimal Algorithms for Byzantine Agreement", May 13, 1988.

Diffie, Whitfield; & Hellman, Martin E., "New Directions in Crytography", IEEE Transactions on Information Theory, vol. IT–22, No. 6, Nov. 1976, pp. 644–654.

Pedersen, Torben Pryds, "Distributed Provers with Applications to Undeniable Signatures", Advances in Cryptology—EUROCRYPT '91, Brighton, UK, Apr. 1991, pp. 221–242.

G. Simmons, "How to Insure that Data Acquired to Verify Treaty Compliance are Trustworthy", Proceedings IEEE, vol. 76, No. 5, May 1988.

Merkle, Ralph C., "A Digital Signature Based on a Conventional Encryption Function", 1987.

Meyer, Carl H.; & Matgas, Stephen M., Cryptography: A New Dimension in Computer Data Security, 1982, pp. 350–428 (Chapters 8 and 9).

Beker, Henry; & Piper, Fred, Cipher Systems, 1982, pp. 292–305 (Sections 8.2 and 8.3).

Longley, Dennis, Data & Computer Security, 1987, pp. 120–323.

Konheim, Alan G., Cryptography—A Primer, 1981, pp. 285–293 (Chapter 7).

Denning D.E.R., Cryptograph & Data Security, 1982, pp. 161–179 (Sections 3.6 and 3.7).

Simmons, Gustavus J., Contemporary Cryptology The Science of Information Integrity, 1992, pp. 325–419 and 615–630 (Chapters 6, 7 and 13).

Micali, S., "Fair Public Key Cryptosystems", Advances in Cryptology—CRYPTO '92, Aug. 1992.

Micali, S., "Fair Cryptosystems", MIT/LCS/TR–579 b, Nov. 1993.

Leighton, Tom; & Micali, S., "New Approaches to Secret–Key Exchange", Apr. 1993.

Leighton, Tom; & Kilian, Joseph, "Failsafe Key Escrow", Aug. 1994.

Rabin, Tal; & Ben–Or, Michael; "Verifiable Secret Sharing and Multiparty Protocols with Honest Majority" (Extended Abstract), Instituteof Mathematics and Computer Science, The Hebrew University, Jerusalem, Israel, Aug. 1989, pp. 73–85.

Karnin, Ehud D.; Greene, Jonathan W.; & Hellman, Martin E., "On Secret Sharing Systems", IEEE Transactions on Information Theory, vol. IT–29, No. 1, Jan. 1983.

Ito, Mitsuru; Saito, Akira; and Nishizeki, Takao, "Secret Sharing Scheme Realizing General Access Structure", Dept. of Electrical Communications, Tohoku University, Sendai, Miyagi 9890, Japan, pp. 3.6.1–3.6.4.

Bearer, Donald; "Multiparty Protocols Tolerating Half Faulty Processors"; Aiken Computation Lab, Harvard University, pp. 560–572.

Gong, Li; "Securely Replicating Authentication Services", Univ. of Cambridge Computer Lab., Cambridge, England, pp. 85–91.

Brassard, Gilles, "On Computationally Secure Authentication Tags Requiring Short Secret Shared Keys", Univ. de Montréal, Dept. d'informatique et de recherche opérationnelle, C.P. 6128, Montreal, Quebec, pp. 79–86.

Meyer, Carl H. & Matyas, Stephen M., "Cryptography: A New Dimension in Computer Data Security", Cryptography Competency Center, IBM Corporation, Kingston, New York, 1982. pp. 350–541.

Christoffersson, Per; Ekhall, Stig–arne; & Fak, Viiveke; "Crypto Users' Handbook: A Guide for Implementors of Cryptographic Protection in Computer Systems", 1988, pp. 8–85.

Longley, Dennis and Shain, Michael; "Data & Computer Security: Dictionary of standards concepts and terms", 1987, pp. 10–421.

Chor, Benny, Shafi Goldwasser, Silvio Micali and Baruch Awerbauch, "Verifiable Secret Sharing and Achieving Simultaneity in the Presence of Faults" (Extended Abstract), Massachusetts Institute of Technology Laboratory for Computer Science, 1985, pp. 383–395.

Goldreich, Oded, Silvio Micali and Avi Wigderson, "Proofs that Yield Nothing But their Validity and a Methodology of Cryptographic Protocol Design" (Extended Abstract), 1986, pp. 174–187.

Graham, S.L and R.L. Rivest, "A Method for Obtaining Digital Signatures and Public–Key Cryptosystems" Communications of the ACM, Feb. 1978, vol. 21, No. 2.

GUARANTEED PARTIAL KEY-ESCROW

RELATED APPLICATIONS

This application is based on and claims priority on Provisional application Ser. No. 60/003,028, filed Aug. 31, 1995 and Provisional application Ser. No. 60/003,223, filed Sep. 5, 1995.

TECHNICAL FIELD

The present invention relates generally to secure communications and more particularly to key escrow.

BACKGROUND OF THE INVENTION

The patent to Micali, U.S. Pat. No. 5,276,737 relates to a key escrow system, whereby trustees hold pieces of secret decryption keys. Among other things, the method allows very strong encryption to be used by law abiding citizens, while making criminals prone to legitimately-issued wiretap orders.

U.S. Pat. No. 5,315,658, also issued to Micali, discloses additional features of a key escrow system with respect to the previously described patent, such as time bounded line-tapping. The reference suggests the implementation of such key escrow systems utilizing tamper proof hardware. In particular, the references teaches that a tamperproof encrypting device, besides producing ciphertext, may also produce matching authentication tags to prove that ciphertext has been produced using an approved key escrow system without any need to understand the corresponding ciphertext.

In the preferred embodiment of the key escrow systems such as described in the above-identified patents, trustees collectively hold pieces of an entire secret decryption key. It would be desirable to provide a key escrow technique that does not require trustees to possess the entire secret key. This type of key escrow may be conveniently referred to as partial key-escrow.

BRIEF SUMMARY OF THE INVENTION

According to one preferred embodiment of the present invention, there is described a method for escrowing secret decryption keys useful in decrypting ciphertexts. The method involves two basic steps. In the first step, a set of one or more trustees (and perhaps others) are provided with a "guarantee" that a given secret decryption key is the composition of a first "subkey" and a second "subkey." The second subkey is substantially easier to compute than the first subkey. In the second step, the trustees are then provided with pieces of information that are guaranteed to include shares of the first subkey. Moreover, if desired, it may be achieved that a sufficient high number of such shares can be combined to yield the first subkey, while any sufficient number of shares are useless to compute the first subkey.

After the keys have been escrowed in the manner described above, the escrowed information may be used to decrypt ciphertexts in a secure communications environment yet still preserve the privacy of the secret decryption keys to a significant extent. Indeed, upon a predetermined request, the trustees reveal their shares of the first subkey to a given entity, which may be a law enforcement agency or a private organization. The predetermined request, without limitation, may be a court-ordered wiretapping. The given entity then determines (or has others determine for it) the second subkey (e.g., possibly even through a brute force calculation), and then uses the first and second subkeys to reconstruct the secret decryption key. The secret decryption key is then used to decrypt ciphertexts decryptable by the secret decryption key.

There are a number of important advantages of the present invention. In the prior art, for example, the trustees held shares of a given decryption key of a public-key cryptosystem. Here, the trustees hold shares of only a secret value (namely, the first subkey), which is not a given decryption key. The decryption key is only yielded by a combination of this secret value and another secret value (namely, the second subkey). This significantly enhances the protection of privacy of those individuals who otherwise might be subject to having their communications illegally monitored (e.g., where the prior art systems are abused by colluding trustees or by an authoritative government). Citizens will thus be more "comfortable" in dealing with such a system as compared to prior key escrow schemes wherein trustees have the capability to surreptiously collude and wrongfully construct the entire secret decryption key.

In addition, by providing the trustees with a "guarantee" as discussed above, the trustees themselves have a "proof" that once they combine their shares (to generate the first subkey), the second subkey, which is much easier to compute, will be readily computable in a reasonable (but not necessarily trivial) period of time. The amount of time necessary to compute the second subkey will vary depending on its length and the complexity of the cryptosystem. In some cases it may take a reasonably long period (e.g., a day to a week) to calculate the second subkey. Even though this period is somewhat lengthy, the guarantee ensures that the calculation will be worthwhile—in other words, that combination of the first and second subkeys in fact will yield the given decryption key.

As used herein, the phrase "first subkey" or "second subkey" should not be taken as a limitation. For instance, the given decryption key may be the combination of a multiplicity of subkeys and the trustees may have shares of some of these subkeys and not others. From a logical point of view, therefore, all the subkeys for which the trustees have constitute a de facto logical "first subkey," and all other or remaining subkeys are a logical "second subkey." Indeed, there may be no multiplicity of subkeys and the trustees may have shares of information that are guaranteed to greatly facilitate the reconstruction of a given secret decryption key. In this case, such pieces of information may yield, de facto, a logical first subkey, and the remaining missing information for constructing the secret decryption key is a de facto second subkey.

BRIEF DESCRIPTION OF THE DRAWINGS

For a more complete understanding of the present invention and the advantages thereof, reference should be made to the following Detailed Description taken in connection with the accompanying drawings in which.

DETAILED DESCRIPTION OF THE PREFERRED EMBODIMENT

Figure 1:
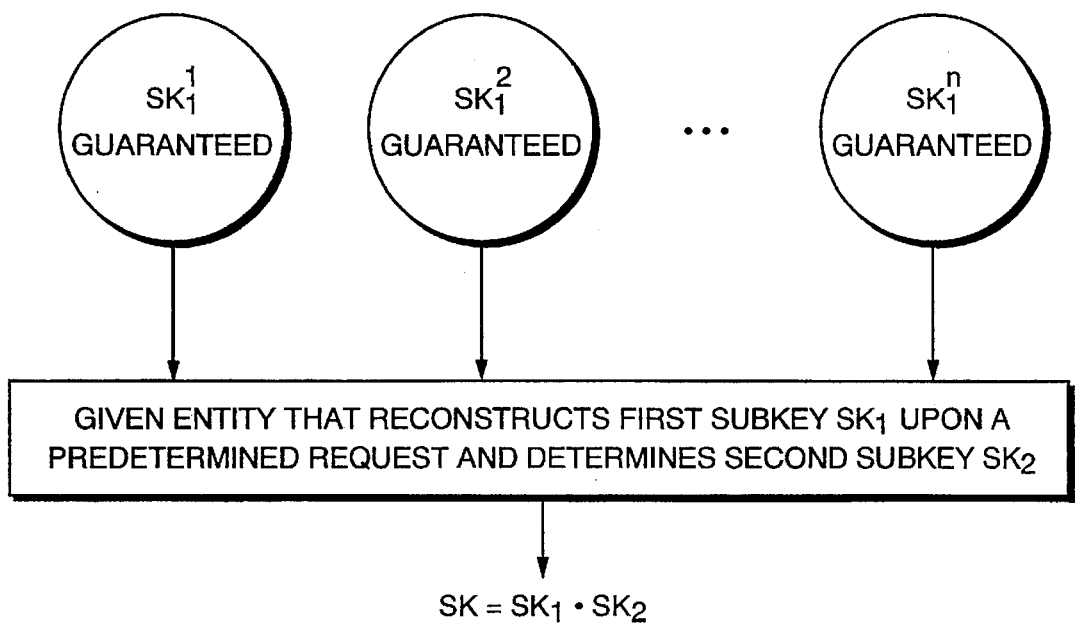
FIG. 1 illustrates a simplified multiple trustee GPKE scheme in which individual trustees of a set of trustees hold shares of a first subkey that are provided to a given entity upon a predetermined request to enable the entity to derive the second subkey.

It is desirable according to this invention to implement partial key-escrow systems wherein it is guaranteed that the pieces of the secret key possessed by the trustees are indeed correct. Indeed, since no one (except, possibly, for the right user) knows the secret key, a trustee cannot judge whether the piece of the secret key in his possession, together with the pieces of other trustees, enables one to reconstruct easily a main portion of the secret key of a user. It is clear that if a partial key-escrow system is used in the context of law-enforcement, or in the context or enabling a private organization to monitor, selectively, the communications of its employees, or in the context of retrieving encrypted and archived data, or for most other contexts, guaranteeing the correctness of each trustee-piece is crucial. Partial key-escrow systems enjoying this fundamental guaranteed-piece property Guaranteed Partial Key-Escrow systems, GPKE systems for short.

It is known to provide key escrow systems whereby (1) trustees have guaranteed pieces of a secret decryption key, (2) too few trustees cannot easily reconstruct the key, but (3) sufficiently many trustees can easily reconstruct the entire key. Another key-escrow scheme with similar properties can be found in the U.S. Government's Clipper Chip proposal.

GPKE systems according to this invention ensure that any ciphertext within the text can be decrypted, with the collaboration of the trustees, by means of a moderately-hard effort. For instance, if one is guaranteed that the portion of a secret key not in the hands of the trustees consists of a short string, then reconstructing the entire secret key with the collaboration of the trustees requires only a moderately-hard effort. In fact, one might always rely on exhaustive search for reconstructing the missing portion of the secret key.

On the other hand, without the collaboration of the trustees, reconstructing a secret decryption key in a GPKE system is practically impossible. Indeed, secret decryption keys in a GPKE system may be arbitrarily long (in which case the trustees will hold guaranteed shares that are also quite long). For this reason, GPKE systems are much preferable to systems where secret keys are required to be suitably short. In fact, these latter systems are moderately hard to crack not only by some designated authority (such as Government, Board of Directors, etc., when they can count on the collaboration of the trustees) but also by anyone else.

Thus, GPKE systems are ideally suitable to be used with current export control laws that forbid the export of cryptosystems with too long keys. Indeed, though the secret key of a GPKE system is very long for everyone else, for —say— law enforcement it is relatively short, assuming that the right circumstances occur which permit the trustees to collaborate with law enforcement.

GPKE may also lessen the worries that some user may have in escrowing her key. Indeed, she would not surrender her entire secret key, and thus not even an entire collection of malicious trustees can trivially get hold of her key.

GPKE systems can be practically implemented in public-key and private-key scenarios, in software and in hardware, as will now be described.

GPKE Systems Based on the RSA

There is now described a software GPKE system based on the RSA public-key cryptosystem (PKC for short). In the RSA cryptosystem, a public key consists of a composite number n, the corresponding secret key of the prime factorization of n, and the encryption of a message $m \in Z^*_n$ (i.e., between 1 and n and relatively prime with n) of the value $m^e$ mod n, where e is an exponent relatively prime with $\phi(n)$ (where $\phi$ represents Euler's totient function). Traditionally, n is chosen to be the product of two large primes.

We instead propose to chose n to be the product of 4 primes, $p^1$, $p^2$, $p^3$ and $p^4$, where $p^1$ and $p^2$ are large (say 512-bit each) and $p^3$ and $p^4$ are small (e.g., 150-bit each). Then $p^1$ and $p^2$ could be revealed to a trustee, while $p^3$ and $p^4$ will remain secret. It has been shown by Chor, Goldwasser, Micali, and Awerbuch [4] that, as long as two primes of an RSA public key remain secret, then the security of the system is essentially at least equal to that of an RSA system in which the public key consists of only those two secret primes. Thus, the trustee still faces an RSA cryptosystem whose public key is the product of $p^3$ and $p^4$. This number is however much more easily factored than the original n! On the other hand, everyone else faces at least an RSA cryptosystem with the original n, and thus a system whose security is at least that of a traditional RSA system with a 1024-bit public key.

Notice that the above described key-escrow system is a GPKE one because the trustee can easily verify to have almost all (but not all) the secret key corresponding to n. Indeed, it can verify that n is 1324-bit long, that $p^1$ and $p^2$ are different primes, that each of them is 512-bit long, and that each of them divides n. In sum we have a system that is moderately hard to crack (but not already cracked!) for the trustee, while it is very hard to crack for everyone else.

Above, we have envisaged using four primes and having a single trustee. Indeed, because in a GPKE system the trustees do not collectively possess the entire secret key, having a single trustee may be quite acceptable. In any case, it should be realized that the above system can be generalized so as to work with an arbitrary number of primes and with many trustees, such as illustrated in FIG. 1, each possessing (if so wanted) a different guaranteed piece of the secret key (while all together they still do not possess the entire secret key). For instance, there may be six distinct primes dividing n, $p^1, \ldots, p^6$, where $p^1, \ldots, p^4$ are 512-bit long and $p^5$ and $p^6$ are 150-bit long, and there may be four trustees, $T_1, \ldots, T_4$, where each $T_i$ knows $p_i$. In this case at least 3 trustees must collaborate in order to make the reconstruction of n's entire factorization only moderately hard. To ensure that each trustee possesses a different prime, proper digits of these primes may be made known (which will not compromise the secrecy of n's factorization, because in general it would be enough to reveal the content of two bit-locations in n's prime factors). Needless to say, each $T_i$ can easily check that the value of those particular digits in his own prime are correct.

Of course, if desired it can also be arranged for redundancy, so that the pieces of secret keys held by the trustees are not totally disjoint. For instance, one may insist that the same piece is given to more than one trustee.

It may also be arranged that the number of trustees exceed that of the primes in n's factorization. For instance, if n is the product of four primes, where $p^1$ and $p^2$ are long and $p^2$ and $p^4$ short as in our first example, the one could make known the products $n'=(p^1 \cdot p^2)$, and $n''=(p^3 \cdot p^4)$ and then share the factorization of n' with arbitrarily many trustees as shown by Micali.

The values 512 and 150 are merely exemplary, and the appropriate balance between the effort of factoring n without the help of the trustees and that of factoring n without the help of the trustees may be obtained by choosing the values that seem most appropriate. (In particular, each prime may be chosen of a different length.)

GPKE Systems Based on the Diffie-Hellman Scheme

Guaranteed Partial Key-Escrow can also be achieved for the Diffie-Hellman cryptosystem. Typically, in such a cryptosystem there is a prime, p, and an element, g, of high order in $Z^*_p$ (preferably g is a generator) that are common to all users in the system. A secret key then consists of a (preferably) randomly selected integer in the interval [1,p−1], and the corresponding public key is $g^x$ mod p. Thus the secret key is the discrete logarithm (in base g) of the public key. Traditionally, p is chosen to be 512-bit long.

To obtain a GPKE system, give a single trustee almost all the bits of x (e.g., all but 64) so as to guarantee him that the bits in his possession are correct. At a high level, represent the secret key x as the sum of two numbers: a long (e.g., 512-bit) number z, and a short (e.g., 64-bit) number y. The idea then is to give the trustee $g^y$ mod p, $g^z$ mod p, z (in a private manner), and a zero-knowledge proof that the discrete log of $g^y$ is suitably short (roughly, a proof that the discrete log of $g^y$ is suitably short that does not reveal y itself).

The trustee can verify that $g^z$ times $g^y$ equals $g^x$ mod p. (This check tells him that if he knew the discrete log of $g^z$ and $g^y$, then the sum of these discrete logs mod p−1 would be the secret key relative to $g^x$.) The trustee can also check that g raised to the power z mod p indeed yields $g^z$. Thus, if he is convinced that y is 64-bit long (without y itself being revealed, as demonstrated below), he would be guaranteed that y could be found by exhaustive search with only a moderately-hard effort, and thus that the entire secret key x could be found by means of a moderately-hard effort.

While the above envisions a single trustee that receives the key z, the method can be extended to work with a multiplicity of trustees. For instance, there may be n trustees: $T_1, \ldots T_n$. In this case, let $z_1, \ldots, z_n$ be n random integers whose sum equals z mod p−1, and let each trustee $T_i$ be privately given $z_i$, while the values $g^{z_i}$ mod p are made known. Then, by having each $T_i$ check that $z_i$ is the correct discrete log of $g^{z_i}$ mod p, and that the product of all $g^{z_i}$ equals $g^z$ mod p, they can verify that if they reveal to some entity their values zi, then that entity can reconstruct z very easily, and thus the entire x with only a moderately-hard additional effort. At the same time, however, no individual trustee, nor any group with less than n trustees can easily reconstruct z (nor x).

If desired, one can also ensure that sufficiently many trustees (rather than all of them) can easily reconstruct z, while sufficiently few of them (rather than n−1) cannot reconstruct z without a very hard effort. For instance, one can use one of the methods disclosed by Micali. Thus, we can also ensure that sufficiently many trustees can reconstruct x with only a moderately-hard effort, while sufficiently few of them can reconstruct x only with an enormously hard effort.

It is now demonstrated that it is possible to prove that the discrete log of $g^y$ is suitably small without revealing it. Proofs of this type are called zero-knowledge proofs. Zero-knowledge proofs have been introduced by Goldwasser, Micali, and Rackoff and are by now well-known in the cryptographic literature. Typically, a zero-knowledge proof of a statement S proceeds by having the Prover present a Verifier two problems, P1 and P2, which are claimed to be both solvable. P1 and P2 are chosen in a special matched way, so that given solutions to both of them one can easily find a proof of S; while given a solution to just one of the two problems does not provide any help in finding the proof of S. After the Prover presents him with P1 and P2, the Verifier chooses at random one of the two problems, and the Prover provides its solution (but not a solution to the other one). This process is repeated several times, choosing the matching P1 and P2 anew each time. Since at each iteration of the matching P1 and P2 are randomly chosen (and since there are enormously many such problem pairs) the Verifier will not get both solutions for a matching P1–P2 and are randomly chosen (and since there are enormously many such problem pairs) the Verifier will not get both solutions for a matching P1–P2 pair, thus the procedure does not reveal the verifier the proof of S. At the same time the procedure convinces the verifier that the statement S must be true. In fact, if it were false, then either P1 or P2 must be unsolvable (because the existence of a solution for both P1 and P2 implies the existence of a proof of S). Thus, at each iteration the Verifier has probability $\leq \frac{1}{2}$ of choosing a problem for which the Power cannot provide a solution. Thus, for instance, if S is false, the probability that the Prover can, ten times in a row, provide a solution to the problem chosen by the Verifier is less than one in a thousand.

Since the statement that the discrete log of $g^y$ is small (e.g., 64-bit long) "is in NP," and since Goldreich, Micali, and Wigderson have shown that there exists a general method for proving in zero-knowledge any NP-property, one could apply their proof-method to the property of interest here. However, such an approach is hardly practical. Indeed, solving a specific problem by a general tool which disregards the problem's own characteristics rarely yields efficient solutions. We thus put forward a zero-knowledge method that exploits the specific properties of the discrete logarithm problem without using any reductions to other problems. The method is described relative to a single trustee, and it can be modified to work with more trustees as discussed above.

A PRACTICAL ZERO-KNOWLEDGE METHOD

For completeness, we also describe the process of choosing an element g of high order. Recall that the order of an element e is k if k is the minimum i such that $e^i = 1$ mod p, in which case for any two different integers i and j between 1 and k, $g^i \neq g^j$ mod p. It is well known that the numbers between 1 and p−1 form a cyclic group under multiplication modulo p, called $Z^*_p$, and that there exist numerous elements g (called generators) whose order is p−1. Thus, if g is a generator, any number X between 1 and p−1 can be expressed as a power of g mod p. This power is unique in the interval [1,p−1], that is, for any $X \in [1,p-1]$, there is a unique $x \in [1,p-1]$ such that $X = g^x$ mod p. This unique power x is called the discrete log of X (in base g and mod p).

Computing the discrete log of X on inputs X, p, g, and the factorization of p−1, is widely believed to be computationally intractable provided that x is sufficiently large and sufficiently random. (Indeed the computational difficulty of the so called Discrete Logarithm Problem underlies the security of many a cryptographic scheme, including the Diffie-Hellman one). The higher the order of the base, the harder is to find discrete logs. Indeed, if g is a generator, the discrete log in base g of an element must be found in the full set [1,p−1] (which includes all 511-bit integers); but if an element e has order k<p−1 (e.g., if k is 64-bit long), then the discrete log of an element (in base e), which is a power of e, must be found in the smaller set [1,k] (e.g., among the 64-bit numbers). Thus, the security of the Diffie-Hellman scheme increases with the order of g and is considered maximum when g is a generator. Accordingly, let us describe our method when g is a generator, realizing, however, that the method also works for other choices of the base.

Assume that we wish to construct a GPKE based on the Diffie-Hellman where the portion of a secret key now escrowed with the trustee consists of 80-bits. Then, we choose p, g and a such that g is a generator mod p and the order of the element $A = g^a$ mod p is 80-bit long. (For simplicity, we also consider the value of a to be common to all users in the system. It should be noted, however, that we may also let a be different for each user.)

To this end, we suggest choosing p so that $p-1=2qQ$, where q is a 80-bit prime (and, preferably), Q has a large prime factor, which makes finding discrete logs and p harder. Primes with similar structure are constructed within the Digital Signature Standard. In practice, one may even first select a 80-bit prime q and then randomly select large (e.g., 432-bit) primes Q until $p=2qQ+1$ is prime. Then, one may select g at random between 1 and $p-1$ until a generator is found, and finally set $a=2Q$. Thus, $A=g^{2Q}$ mod p.

(Given the abundance of generators in $Z^*_p$, one needs to try relatively few elements. Moreover, it is easy to realize that the selected element g is a generator. Indeed, we must show that $g^i \neq 1$ mod p for any i dividing $p-1$. While at first glance it appears that too many i must be tried, it is not hard to see that, in our case—i.e., when $p-1=2qQ$, where both q and Q are primes,—it suffices to compute $g^{qQ}$, $g^{2Q}$, and $g^{2q}$ mod p, and verify that none of these values equals 1. If g is a generator, then $A=g^{2Q}$ has order q. Indeed, if $A^i$ equaled 1 mod p for some $i<q$, then $d=1$ mod p, where $d=2Qi<p-1$, contradicting the assumption that g is a generator.)

Given our p, g, and a (and thus A), we suggest to choose a secret key for the Diffie-Hellman system to be $x=ar+R$ mod p, where r is randomly chosen between 1 and q (and thus is a 80-bit integer) and R is randomly chosen between 1 and $p-1$ (and thus is a 512-bit integer). Thus, as usual, x is randomly chosen between 1 and $p-1$. The public key corresponding to x is, as usual, $g^x$ mod p. The trustee is then given $B=g^{ax}$ and $C=g^R$ mod p as well as (privately!) R. Thus, he can verify that R is the discrete log of C mod p and that the product of B and C equals $g^x$ mod p. Thus, he knows that if he could compute the discrete log of B mod p, he could easily compute the discrete log of $g^x$ (i.e., the entire secret key) by adding mod $p-1$ the discrete log of B and R.

However, we still need to have a guarantee that the discrete log of B is computable by a modestly-hard effort. To this effect, it is enough to have a zero-knowledge proof that B belongs to the subgroup generated by $A=g^a$ mod p. In fact, the order of A is guaranteed to be 80-bit long, and thus if B is proved to be a power of A rood p, then this power, r, cannot be more than 80-bit long, and thus recoverable only by a moderately hard computation (particularly if a "database" approach is used to find r). Once r is found, reconstructing the secret key x by computing $ar+R$ mod $p-1$ is very easy.

Now, the fact that an element B belongs to the subgroup generated by some element A is already known to be provable in zero-knowledge due to the work of Tompa and Woll. In essence, the Prover presents the Verifier with two random elements in the subgroup, I and J, whose product equals B, the Verifier chooses one of them at random, and the Prover releases the discrete log of that element in base A.

Notice that the above zero-knowledge proof requires interaction between Prover and Verifier. In our application, however, interaction may not be practical. Indeed, it is unlikely that, in a large country, a single trustee can interact about every partially-escrowed secret key in order to verify that he has a genuine main piece.

To dispose of interaction, we may thus adopt a technique put forward by Fiat and Shamir in the context of digital signature schemes. For instance, the Prover may choose a sequence S of 100 pairs of randomly selected I-J pairs: $S=I_1J_1 \ldots I_{100}J_{100}$. Then, he applies a given pseudo-random function H to this sequence (preferably concatenated with B as well and p and g) so as to obtain a 100-bit result: $b_1 \ldots b_{100}$. (Think of H as a one-way function mapping any string to a sufficiently random 100-bit string.) Then, for each i between 1 and 100, he releases one value $R_i$ as follows. If $b_i=0$ $R_i$ is the discrete log (base A) of $I_i$; else, $R_i$ the discrete log (base A) of $J_i$. The sequence S together with the Sequence $R_1 \ldots R_{100}$ is a string, $\Sigma$, proving that B is in the subgroup generated by A.

The string $\Sigma$ can be verified as follows. First, the pseudo-random function H is evaluated on S so as to obtain the 100 bits $b_1 \ldots b_{100}$. Then, for each i between 1 and 100, $A^{Ri}$ mod p is computed and it is checked whether the resulting value is $I_i$ (if $b_i=0$) or $J_i$ (if $b_i=1$).

Though the bits $b_i$ are not chosen randomly by the Verifier (indeed they are determined by the sequence S via the function H), they are chosen in a way that is random enough for our purposes. Indeed, if B were not in the subgroup generated by A, then, for each i, either $I_i$ or $J_i$ is not in that group, and thus its discrete log in base A does not exist. Thus, in order to construct a string proving that B is in the subgroup, a cheating Prover should be able to construct a special sequence $S'=I'_1J'_1 \ldots I'_{100}J'_{100}$ that, under H, yields 100 bits $b'_i$ such that each of the 100 i, select exactly the only value between $I_i$ and $J_i$ which has a discrete log base A.

Notice that if the bits $b'_i$ were randomly selected, then the probability that all the bits $b'_i$ "select" exactly the only 100 elements of S having a discrete log base A is a remotely small; namely, one in $2^{100}$. Thus, even if the bits $b'_i$ obtained via H are not truly random, lots and lots of sequences S' should be tried before one is found such that the bits H(S') select the "right" 100 elements.

So far we have argued that the sequence S together with the sequence of the $R_i$ provide convincing evidence that B is in the subgroup generated by A. It should also be noted that this piece of evidence does not betray the discrete log (base A) of B in any practical manner. It is by now widely believed that if the original interactive proof was zero-knowledge, then the so obtained non-interactive proof (i.e., string) does not reveal in practice any significant additional information either. (Indeed, this way of replacing interaction forms the base of many a cryptographic schemes.) Indeed, extracting the discrete log of B from S and the $R_i$ appears to be a formidable task.

Another way to prove non-interactively that B belongs to the subgroup generated by A without revealing its discrete log is using the non-interactive zero-knowledge proofs à la Blum, Micali and Feldman.

In sum, it is also possible to prove that a given partial key-escrow system is a GPKE system without any interaction, that is, by just providing a special string for each secret key. Of course, within the scope of the invention one may also construct a low-knowledge method rather than a method that is exactly zero knowledge as described.

Hardware-Based GPKE Systems

Figure 2:
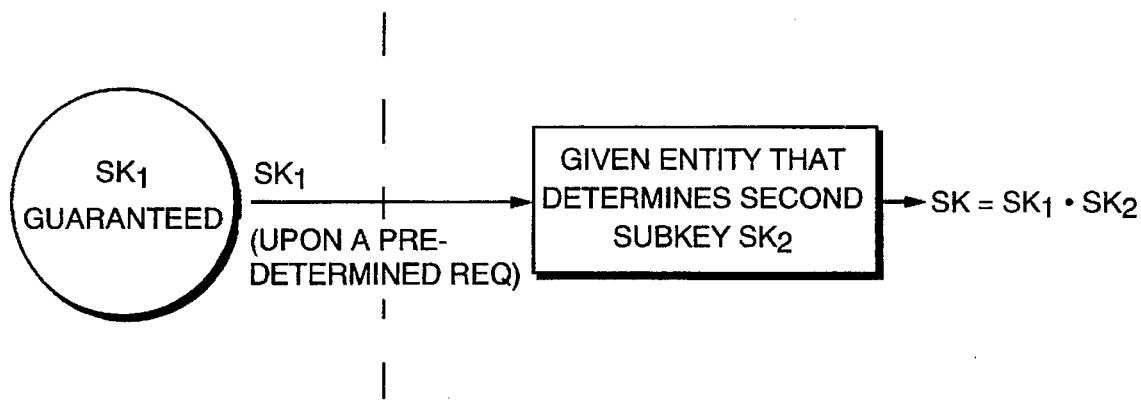
FIG. 2 illustrates a simplified single trustee GPKE scheme in which the trustee provides the first subkey to the given entity upon a predetermined request, the entity derives the second subkey and then outputs the secret key.

Hardware-based guaranteed partial key-escrow systems are now described and illustrated, by way of example only, in FIG. 2. In the simplest embodiment, assume that secure chips are manufactured so that (like the Clipper Chip) they have a special decryption key inside. Assume that 100-bits is deemed to be a secure length for these keys. Then, a special agent can provide the chip with a 50-bit key, and the chip can choose the other 50 bits in a random manner (e.g. by a noise diode); or the user chooses the other 50 bits. Then an enemy faces a chip with a secret 100-bit key while the trustee (and thus law enforcement) a chip with just a 50-bit key. Note that the trustee has a guaranteed first subkey, namely the first 50 bits, because the hardware is manufactured so as to compute the full key in this manner. The fact that the hardware is secure prevents anyone else from altering the functionality of the chip.

This goal can be accomplished by secure hardware also when it is up to the user of the chip to choose the entire 100-bit key of the chip. The chip may in fact reveal the first 50 bits of this key to a trustee. For instance, it sends them along together with each ciphertext, encrypted with an internal key that only the trustee knows. Preferably, the secure chip sends these bits to the trustee in an authenticated manner (via a secret key that the chip and the trustee share). Notice that in this manner, the trustee holds a guaranteed portion of the secret decryption key. In fact, the 50 bits it receives from the chip constitute the first subkey and the remaining 50 bits the second subkey. If so wanted, the first subkey may be chosen to be bigger than the second subkey.

Moreover, before the chip starts functioning it is preferred that it receives a special signal from the trustee, and the trustee will give this activation signal only after the chip sends him an encrypted version of the first 50 bits of its chosen secret key. Of course 100 and 50 are variables, it is not necessary that the bits in possession of the special agent are the first 50, and other precautions can be taken to make sure that the chip works as desired. Of course, these hardware-based GPKE systems can be modified to work with a multiplicity of trustees if desired.

In summary, according to the present invention, a given decryption key is decomposed into at least two parts, for example, a first subkey and a second subkey. The first subkey may be verifiably secret-shared among a set of one or more trustees, whereas the trustees preferably receive no information at all about the second subkey. Reconstruction of the first subkey by the trustees does not yield a decryption key useful by itself in decrypting ciphertexts, and thus the present invention differs from prior art schemes, such as Micali '737. The trustees, however, also receive a guarantee that once they reveal their shares to a given entity, the entity has the capability of determining the second subkey. Generally, the generation of the second subkey will be carried out by the entity using a brute force technique, although the calculation may be performed by still another party (or even the trustees themselves in cooperation with the entity). Once the second subkey is determined, the guarantee ensures that combination of the first and second subkeys (which may be effected using a concatenation operator, a hashing operator, a modulo addition or multiplication operator, etc.) yields a given decryption key. If desired, the guarantee may be provided by a piece of secure hardware, although this is not required. The subkeys may be "logical."

The embodiments described herein in detail for exemplary purposes are, of course, subject to many different variations in structure, design, application and methodology.

What is claimed is:

1. A method for escrowing secret decryption keys useful in decrypting ciphertexts, comprising the steps of:

providing a set of trustees a guarantee that a secret decryption key is the composition of a first subkey and a second subkey; and providing each trustee of the set pieces of information enabling each trustee to verify that the piece of information includes a share of the first subkey.

2. The method of claim 1 wherein the second subkey is substantially easier to compute than the first subkey.

3. The method as described in claim 1 further including the step of:

having at least some trustees reveal their shares of the first subkey to a given entity upon a predetermined request.

4. The method as described in claim 3 wherein the given entity is a law enforcement agency.

5. The method as described in claim 4 wherein in the predetermined request is a Court wiretapping order.

6. The method as described in claim 5 wherein the given entity determines the second subkey and uses the first and second subkeys to reconstruct the secret decryption key to thereby decrypt ciphertexts decryptable by the secret decryption key.

7. The method as described in claim 3 wherein the given entity is a private organization.

8. The method as described in claim 1 wherein the shares of at least a first subset of the set of trustees are sufficient to reconstruct the first subkey while the shares of at least a second subset of the set of trustees are insufficient to reconstruct the first subkey.

9. The method as described in claim 1 wherein secure hardware guarantees that the combination of the first and second subkeys is a given secret decryption key.

10. A method for escrowing secret decryption keys useful in decrypting ciphertexts, wherein a given secret decryption key is guaranteed to be a combination of a first and second subkey, comprising the steps of:

having each of a set of trustees hold guaranteed shares of a first subkey of a given secret decryption key; and upon a predetermined request, having the trustees reveal their shares to a predetermined entity so as to enable the reconstruction of the first subkey.

11. The method as described in claim 10 further including the steps of:

determining the second subkey; and using the first and second subkeys to reconstruct the given secret decryption key to thereby enable the decryption of ciphertexts decryptable by the given secret decryption key.

12. The method of claim 11 wherein the second subkey is substantially easier to compute than the first subkey.

13. A method for escrowing secret keys, comprising the steps of:

having a secret key be the composition of a first subkey and a second subkey;

providing a trustee a piece of data that is guaranteed to be the first subkey of a secret key.

14. The method of claim 13 wherein the second subkey is substantially easier to compute than the first subkey.

15. The method as described in claim 13 further including the step of:

having the trustee reveal the piece of data to a given entity upon a predetermined request.

16. The method as described in claim 15 wherein the given entity is a law enforcement agency.

17. The method as described in claim 15 wherein the predetermined request is a Court wiretapping order.

18. The method as described in claim 17 wherein the given entity determines the second subkey and uses the first and second subkeys to reconstruct the secret key.

19. The method as described in claim 15 wherein the given entity is a private organization.

20. The method as described in claim 13 wherein secure hardware guarantees that the combination of the first and second subkeys is a given secret key.

21. A method for escrowing secret keys, wherein a given secret key is guaranteed to be a combination of a first and second subkey, comprising the steps of:

having a trustee hold a piece of data guaranteed to be a first subkey of the given secret key; and upon a predetermined request, having the trustee reveal the piece of data to enable reconstruction of the given secret key.

22. The method as described in claim 21 further including the steps of:

determining the second subkey; and using the first and second subkeys to reconstruct the given decryption key.

23. The method of claim 22 wherein the second subkey is substantially easier to compute than the first subkey.

* * * * *